United States Patent

Lanni et al.

[11] 4,016,469
[45] Apr. 5, 1977

[54] SENSOR INCLUDING MEANS FOR OPERATING THE SENSOR IN RATE MEASURING AND STABILIZATION MODES

[75] Inventors: Michael J. Lanni, Ridgewood, N.J.; John Calamera, Staten Island, N.Y.

[73] Assignee: The Bendix Corporation, Teterboro, N.J.

[22] Filed: Dec. 17, 1974

[21] Appl. No.: 533,606

[52] U.S. Cl. .............................. 318/590; 318/648; 318/689; 73/504
[51] Int. Cl.² ........................................ B64C 17/02
[58] Field of Search .............. 73/504; 318/648, 649, 318/689, 590; 74/5.4–5.5

[56] References Cited

UNITED STATES PATENTS

| | | | |
|---|---|---|---|
| 2,647,233 | 7/1953 | Kutzler | 318/648 X |
| 2,751,540 | 6/1956 | Lower | 318/648 X |
| 2,804,776 | 9/1957 | Summers, Jr. | 74/5.6 |
| 2,951,374 | 9/1960 | Summers, Jr. | 74/5.5 |
| 2,951,377 | 9/1960 | Lahde | 74/5.46 X |
| 3,077,553 | 2/1963 | Borghard et al. | 318/649 |
| 3,182,244 | 5/1965 | Fitzroy, Jr. et al. | 318/689 |
| 3,237,313 | 3/1966 | Gejas | 318/649 X |
| 3,301,072 | 1/1967 | Simons et al. | 74/5.6 |
| 3,398,341 | 8/1968 | Dooley et al. | 74/5.4 X |
| 3,526,145 | 9/1970 | Boerner et al. | 74/5.46 |
| 3,534,327 | 10/1970 | Lukso | 318/648 X |
| 3,619,906 | 11/1971 | Yates et al. | 318/649 X |

Primary Examiner—James R. Scott
Assistant Examiner—John J. Feldhaus
Attorney, Agent, or Firm—Anthony F. Cuoco

[57] ABSTRACT

A sensor including means for operating the sensor in angular rate measuring and stabilization or rate integrating modes. When operating in the rate measuring mode, a loop is closed through an amplifier and torquer to null the sensor and when operating in the stabilization mode said loop is open and another loop is closed through a load to maintain the sensor at null. In the stabilization mode, the amplifier is used to apply command rate and drift correction signals to the sensor.

5 Claims, 2 Drawing Figures

SENSOR INCLUDING MEANS FOR OPERATING THE SENSOR IN RATE MEASURING AND STABILIZATION MODES

CROSS REFERENCE TO RELATED APPLICATIONS

The device of the invention may use a sensor including combined sensing, torquing and damping functions such as described in U.S. application Ser. No. 454,335, filed on Mar. 25, 1974 by Gunnar J. Vold and assigned to The Bendix Corporation, assignee of the present invention.

BACKGROUND OF THE INVENTION

1. Field of the Invention

This invention relates to sensors such as rate gyros which are operable in angular rate measuring and stabilization or rate integrating modes. More particularly, this invention relates to a sensor of the type described having a single configuration for operating in the aforenoted modes.

2. Description of the Prior Art

Prior art sensors such as rate gyros require separate sensing, torquing and damping components. With the advent of the invention described in the aforenoted U.S. application Ser. No. 454,335, these elements were combined into a single structural relationship. The present invention uses this single structural relationship to operate the sensor in rate measuring and stabilization modes.

SUMMARY OF THE INVENTION

This invention contemplates a sensor including circuit means for operating the sensor in angular rate measuring and stabilization or rate integrating modes. In the rate measuring mode, a signal provided by a sensing element in response to a sensed condition is applied to an amplifier which provides the necessary power amplification for driving a torquer connected to the sensor gimbal in closed loop configuration to torque the gimbal to null. In the stabilization mode the aforenoted loop is open and the sensing element signal is applied through another closed loop including a buffer amplifier and servo means for driving a load. The load is displaced, and which displacement is applied to the sensor to maintain the sensor gimbal at null. In the stabilization mode, i. e., when the loop including the amplifier is open, rate command and bias drift correction signals are applied to the sensor through the amplifier.

The main object of this invention is to provide a sensor having a single structural arrangement whereby the sensor operates in angular rate measuring and stabilization or rate integrating modes.

Another object of this invention is to drive the sensor through a closed loop including an amplifier and a torquer for torquing the sensor to null when the sensor is in the rate measuring mode, and for driving the sensor through another closed loop, said first mentioned loop being open, including a load for maintaining the sensor at null when the sensor is in a stabilization mode.

Another object of this invention is to use the amplifier to apply rate command and drift correction signals to the sensor when the sensor is operating in the stabilization mode.

Another object of this invention is to provide a device of the type described which utilizes a sensor having a single structural arrangement for providing sensing, torquing and damping functions such as described in the aforenoted copending U.S. application Ser. No. 454,335.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
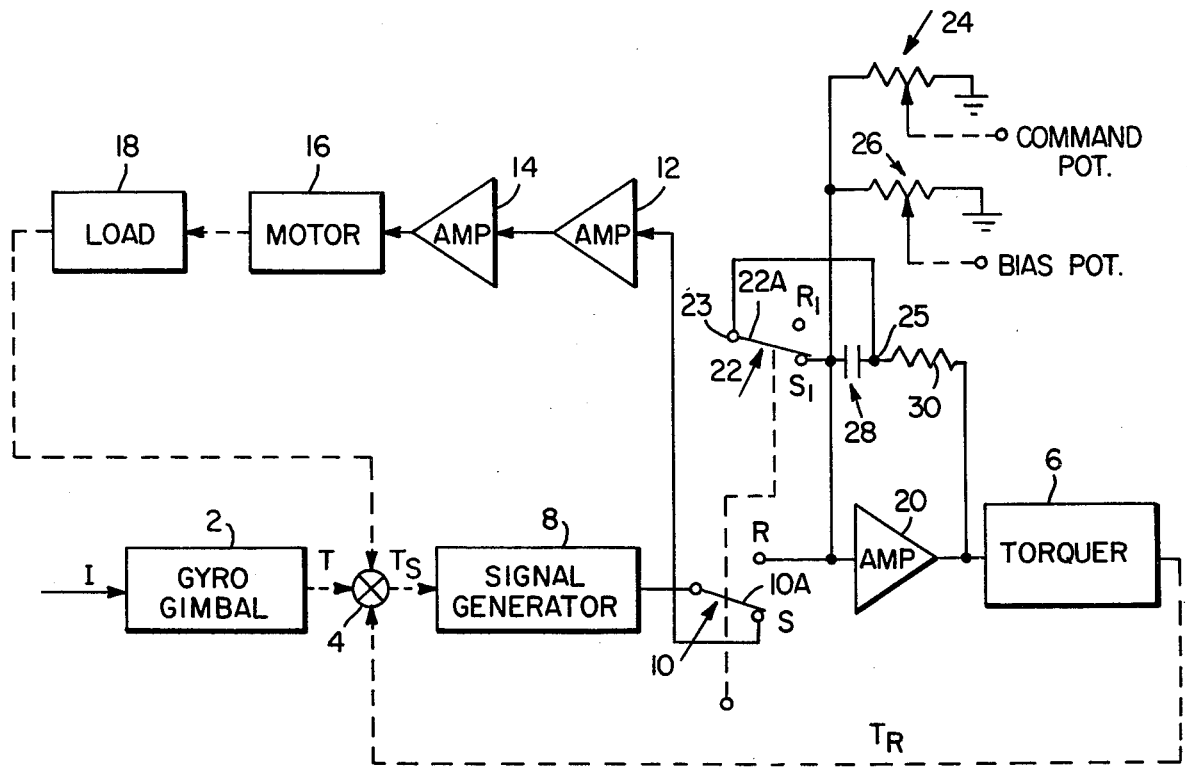
FIG. 1 is a block diagram-electrical schematic showing an embodiment of the invention, wherein switches are manually operated for rendering the sensor in angular rate measuring and stabilization modes.

With reference first to FIG. 1, a sensor gimbal 2, which may be a conventional gyro gimbal, receives an inertial input I and provides a torque T corresponding to the angular rotational rate of the gyro rotor or mass and the moment of inertia thereof. This torque is applied to a summing means 4 and summed thereby with a torque $T_R$ provided by a loop closing torquer 6 as will be hereinafter explained, and which torque $T_R$ is a restoring torque for torquing gimbal 2 to null. Summing means 4 is shown for illustrative purposes as external gimbal 2, but is actually a point on the gimbal as will be understood by those skilled in the art in other words, the torques are summed at gimbal 2.

The summed torque from summing means 4, and designated as $T_s$, displaces a signal generator 8, and which signal generator 8 may be a conventional type gyro pickoff mounted on gimbal 2. Signal generator 8 provides a signal corresponding to the displacement, and which signal is applied to a switch designated generally by the numeral 10.

As shown in FIG. 1, switch 10 includes an arm 10A which is connected to a terminal S so that the sensor of the invention is in a stabilization or rate integrating mode. The signal from signal generator 8 is applied through switch arm 10A connected to terminal S, and therefrom to a buffer amplifier 12. Buffer amplifier 12 drives a servo amplifier 14, which in turn energizes a motor 16 for driving a load 18, and which load 18 may be, for purposes of illustration, another gyro gimbal in tandem arrangement with gimbal 2 as is well known in the art, or may be any other type driven load as the case may be.

Load 18 is displaced by motor 16 and the displacement thereof is applied to summing means 4 and combined thereby with torque T from gyro gimbal 2 and torque $T_R$ from torquer 6 to provide at the output of summing means 4 torque $T_s$. Thus, a loop is closed through load 18, whereby the aforenoted gimbal null condition is maintained.

When it is desired to operate the apparatus of the invention in the rate measuring mode, switch 10 is manually operated to connect switch arm 10A to terminal R. In this case, the output from signal generator 8 is applied through switch arm 10A connected to terminal R to an amplifier 20 which drives torque 6 for providing torque $T_R$, and which torque is applied to summing means 4 for nulling gimbal 4 as heretofore noted. In this instance, a loop is closed through torquer 6 for providing a torque-to-balance condition. The loop including amplifiers 12 and 14, motor 16 and load 18 is open and does not effect the operation of the invention.

A switch 22 is in ganged arrangement with switch 10 so as to be operable therewith. Switch 22 includes an arm 22A. When switch arm 10A is connected to terminal S, switch arm 22A is connected to terminal $S_1$, and the apparatus of the invention is in the stabilization mode as heretofore noted. Under these circumstances, amplifier 20 is utilized to process command rate and bias drift correction signals as will be next described.

An operator-controlled potentiometer 24 is connected to the input of servo amplifier 20 to apply a rate command signal thereto and an operator-controlled bias drift correction potentiometer 26 is connected to amplifier 20 to apply a drift correction signal thereto. A capacitor 28 is connected to terminal $S_1$ and a registor 30 is serially connected to capacitor 28 and is connected intermediate amplifier 20 and torquer 6. Switch 22 is connected at a point 23 to a point 25 intermediate capacitor 28 and resistor 30.

When the apparatus of the invention is operated in the stabilization mode; that is, with switch arm 10A connected to terminal S and switch arm 22A connected to terminal $S_1$ so that the loop including amplifier 20 is open and the loop including load 18 is closed, resistor 30 shunts out capacitor 28 to provide a linearized current flow as will now be understood.

When the apparatus of the invention is operated in the rate measuring mode; that is, with switch arms 10A and 22A connected to terminals R and $R_1$, respectively, so that the loop including amplifier 20 is closed and the loop including load 18 is open, capacitor 28 provides the necessary frequency response to amplifier 20 as will also be understood.

Figure 2:
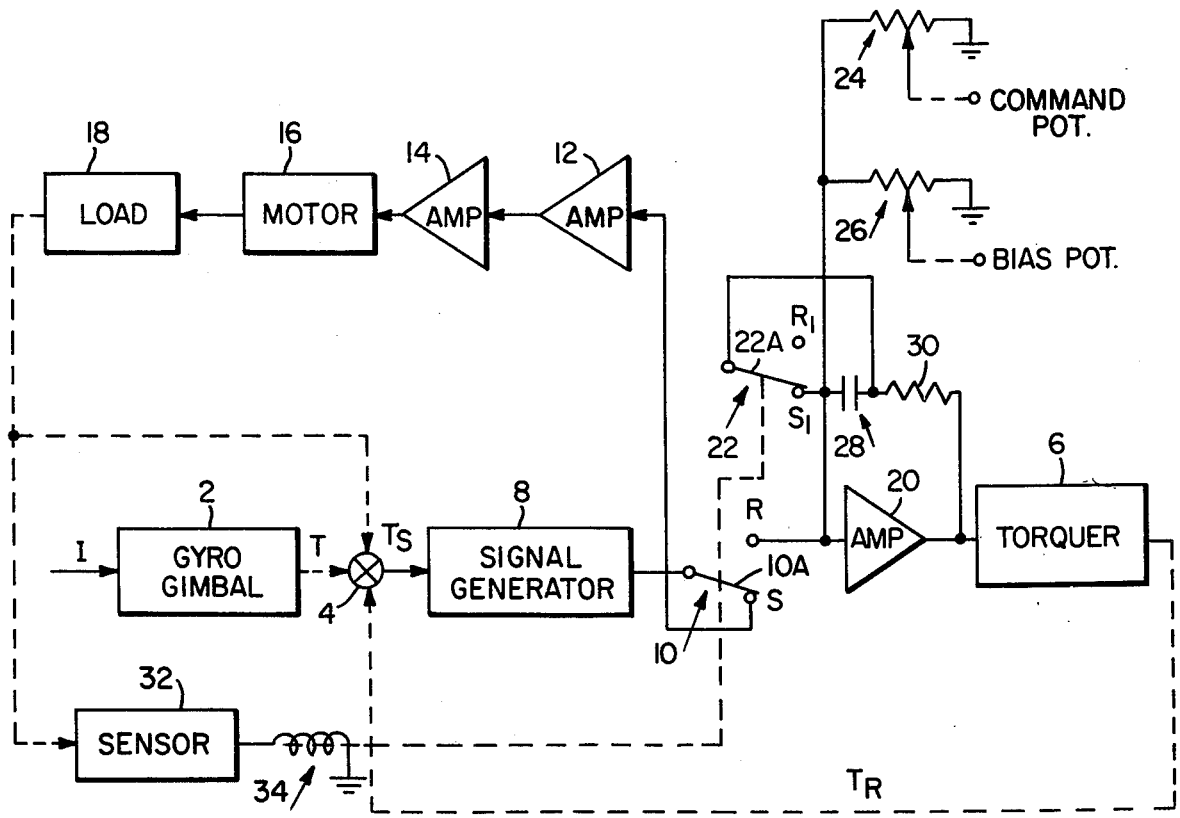
FIG. 2 is a block diagram-electrical schematic showing another embodiment of the invention, wherein the switches rendering the apparatus operable in the rate measuring and stabilization modes are automatically operated in response to a sensed load condition.

In the embodiment of the invention of FIG. 2, switches 10 and 22 are automatically operated in response to a condition of load 18 which may be the displacement thereof. The system including the invention may be such that it is desirable to transfer from the stabilization mode to the rate mode upon a predetermined displacement of load 18. To accommodate this situation, a sensor 32 is connected to load 18 for sensing the displacement and provides a corresponding signal which actuates a relay 34. Relay 34, in turn, operates switches 10 and 22 to displace arms 10A and 22A from terminals S and $S_1$ to terminals R and $R_1$, respectively, and to return the switch arms to terminals S and $S_1$ upon a lesser displacement occurring, as the case may be.

It will now be seen that the aforenoted objects of the invention have been met. Apparatus is provided wherein a single structural arrangement is provided for operating a sensor in angular rate measuring and stabilization or rate integrating modes. In the rate measuring mode, a loop is closed through an amplifier and torquer to drive the sensor gimbal to null and in the stabilization mode a loop is closed through a load to maintain the gimbal at null. In the stabilization mode, the amplifier, now in open loop configuration, is used to process command rate and bias drift correction signals, while in the rate measuring mode with the amplifier in closed loop configuration, the necessary frequency response is provided to the amplifier.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A sensor system, comprising:

a sensor;

sensing means for providing a signal corresponding to a sensed condition;

first and second driving means;

the first driving means including an amplifier selectively connected to the sensing means through the switching means for amplifying the signal therefrom, and a torquer connected to the amplifier and to the sensor and responsive to the amplified sensing means signal for torquing the sensor to null;

switching means connected to the sensing means and operable for selectively connecting the first and second driving means to the sensor in closed loop configuration;

the switching means including first and second ganged switches, the first switch being operable for selectively connecting the first and second driving means to the sensor, and the second switch being operable with the first switch for connecting circuit means to the amplifier for affecting operation of said amplifier; and the circuit means including a capacitor connected to the second switch, a resistor serially connected to the capacitor and connected intermediate the amplifier and torquer, the resistor shunting out the capacitor for providing a linearized current flow when the second switch is operated with the first switch so that the second driving means is connected to the sensor in closed loop configuration, with the sensor being thereupon in the stabilization mode, and the capacitor providing a predetermined frequency response when the second switch is operated with the first switch so that the first driving means is connected to the sensor in closed loop configuration, with the sensor being thereupon in the rate measuring mode.

2. A system as described by claim 1, wherein:
the second driving means includes servo means selectively connected to the sensing means through the switching means for displacing a load in response to the signal from the sensing means; and the load connected to the sensor for applying a corresponding displacement to the sensor for maintaining the sensor at null.

3. A system as described by claim 1, wherein the means connected to the first driving means for applying rate command and drift correction signals to the sensor when the second driving means is connected to the sensor in closed loop configuration includes:

a first potentiometer connected to the amplifier and operator-operable for applying a rate command signal to the amplifier; and a second potentiometer connected to the amplifier and operator-operable for applying a bias drift correction signal to the amplifier.

4. A system as described by claim 1, wherein:

the switching means is operator-operable for selectively connecting the first and second means to the sensor in closed loop configuration.

5. A system as described by claim 2, including:

displacement sensing means connected to the load for sensing the displacement thereof and for providing a corresponding signal; and means connected to the displacement sensing means and to the switching means for selectively connecting the first and second driving means to the sensor in closed loop configuration in response to the signal from the displacement sensing means.

* * * * *